United States Patent [19]

Gorman et al.

[11] Patent Number: 5,191,558
[45] Date of Patent: Mar. 2, 1993

[54] SYSTEM FOR DETERMINING THE ANGLE OF IMPACT OF AN OBJECT ON A STRUCTURE

[75] Inventors: Michael R. Gorman, Monterey, Calif.; William H. Prosser, Newport News, Va.

[73] Assignee: The United States of America as represented by the Administrator of the National Aeronautics and Space Administration, Washington, D.C.

[21] Appl. No.: 903,708

[22] Filed: Jun. 17, 1992

[51] Int. Cl.$^5$ .................................................. G01S 3/80
[52] U.S. Cl. .................................................. 367/124
[58] Field of Search .................... 367/118, 124; 73/11, 73/12

*Primary Examiner*—Daniel T. Pihulic
*Attorney, Agent, or Firm*—George F. Helfrich

[57] ABSTRACT

A method for determining the angle of impact of an object on a thin-walled structure which determines the angle of impact through analysis of the acoustic waves which result when an object impacts a structure. Transducers are placed on and in the surface of the structure which sense the wave caused in the structure by impact. The waves are recorded and saved for analysis. For source motion normal to the surface, the antisymmetric mode has a large amplitude while that of the symmetric mode is very small. As the source angle 22 increases with respect to the surface normal, the symmetric mode amplitude increases while the antisymmetric mode amplitude decreases. Thus, the angle of impact is determined by measuring the relative amplitudes of these two lowest order modes.

1 Claim, 5 Drawing Sheets

SYSTEM FOR DETERMINING THE ANGLE OF IMPACT OF AN OBJECT ON A STRUCTURE

ORIGIN OF THE INVENTION

The invention described herein was made by employees of the United States Government and may be used by and for the Government for governmental purposes without the payment of any royalties thereon or therefor.

TECHNICAL FIELD OF THE INVENTION

The present invention relates generally to measuring an angle of impact, and more particularly to measuring an angle of impact using analysis of acoustic waves resulting from the impact.

BACKGROUND OF THE INVENTION

Determining the angle of impact of an object on a structure is an important parameter in assessing the amount of damage caused by the impact. Currently only one method is available for determining the angle of impact of an object against a structure, high speed photography. This method requires a great deal of equipment and produces data which requires a great deal of time to analyze.

Presently, the acoustic emission technique is being used to assess damage caused by the impact of an object, however, this technique as now used does not provide information about the angle of impact.

It is accordingly an object of the present invention to provide a method for determining the angle of impact of an object on a structure.

It is another object of the present invention to provide a method for determining the angle of impact of an object on a thin-walled structure which is independent of the geometry of the structure.

It is another object of the present invention to provide a method for determining the angle of impact of an object on a structure which provides data that is easily and quickly analyzed.

It is another object of the present invention to achieve the foregoing objects in a simple manner.

Additional objects and advantages of the present invention are apparent from the drawings and specification which follow.

SUMMARY OF THE INVENTION

According to the present invention, the foregoing and additional objects are obtained by providing a method for determining the angle of impact of an object on a thin-walled structure. A broad band transducer is mounted on the surface or within the surface of the structure for detecting impacts. When an impact is detected causing at least one symmetric and at least one antisymmetric mode wave, the resulting guided mode waves are amplified and filtered. The lowest order symmetric and antisymmetric mode waves are compared to determine the angle of impact.

DETAILED DESCRIPTION OF THE INVENTION

Figure 1:
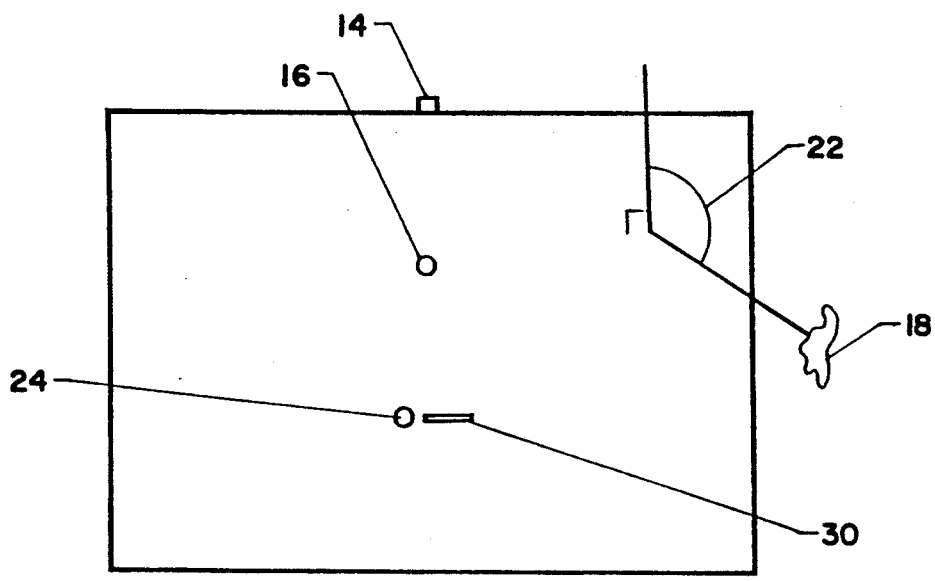
FIG. 1 is a plan view of a thin plate.

The structure which will be impacted is outfitted with broad band acoustic transducers 14, 16, and 24 as shown in FIG. 1. There must be at least one in plane transducer 14 or one out-of-plane transducer 16. When the structure 12 is struck by an object, the resulting guided mode acoustic waves are amplified and filtered in a preamplifier 20. The waveforms are then digitized and stored for analysis. The analysis is based on the fact that the acoustic emission signals propagate as guided modes in thin plate, shell, or tube structures. In particular, in thin materials, the signals are dominated by the two lowest order guided modes. These are the $0^{th}$ order symmetric and the $0^{th}$ order antisymmetric mode waves. The relative amplitudes of the displacement component normal to the surface of the two modes are dependent on the direction of the source motion with respect to the normal. For source motion normal to the surface, the antisymmetric mode has a large amplitude while that of the symmetric mode is very small. As the source angle 22 increases with respect to the surface normal, the symmetric mode amplitude increases while the antisymmetric mode amplitude decreases. Thus, the angle of impact is determined by measuring the relative amplitudes of these two lowest order modes.

EXAMPLE

Figure 2:
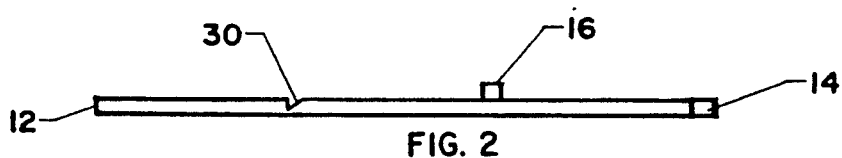
FIG. 2 is a cross sectional view of FIG. 1.

Acoustic emission signals were produced by pencil lead breaks (Hsu-Neilsen sources) at 0°, 30°, 60° and 90° with respect to the plane of the plate on a set of aluminum plates and the amplitudes of the displacement measured. At each angle, the break was repeated ten times to determine the variability of the magnitude of the impulse applied to the plate 12. The dimensions of the plates were 508 mm in width, 381 mm in length, and 6.35 mm in thickness. The lead break normal to the plate (90°) was positioned at the center width of the plate 12 and at a length of 127 mm from the plate 12 edge. For the case of 30° and 60° lead breaks, slots 30 were machined into the plate at the same position as the 90° break to allow the lead to be broken at an angle. A plan view of the plate 12 showing the positioning of the slot 30 is presented in FIG. 1. A cross-sectional view of the plate 12 and slot 30 is shown in FIG. 2. For the case of the 0° break, where the source motion is parallel to the plane of the plate 12, the break was positioned on the edge of the plate at the center of the width.

The waveforms were detected by 3.5 MHz ultrasonic transducers 14, 16, and 24 (Panametrics). These transducers offer relatively flat frequency response over the 20 kHz to 1 MHz frequency range of acoustic emission signals in comparison to conventional low frequency resonant acoustic emission transducers. One transducer 16 measured the out-of-plane displacement component and was positioned on the surface of the plate 12. For the 30°, 60° and 90° sources, this transducer 16 was placed at the center of the width and at a distance of 254 mm from the plate edge (or 127 mm from the source location). For the 0° case, where the source was on the plate edge, the source to receiver distance was maintained at 127 mm and thus it was positioned along the center width 127 mm from the edge.

The second transducer 14 was used to determine the in-plane displacement component and was placed on the opposite edge of the plate at the center width. Thus the source to receiver distance for all of the breaks except the 0° break was 254 mm. For the 0° break, the propagation length was longer (381 mm); this break was carried out on a separate plate that was only 254 mm in length. This was done in order to compare the wave amplitudes from all of the sources for the same propagation distance.

Figure 3:
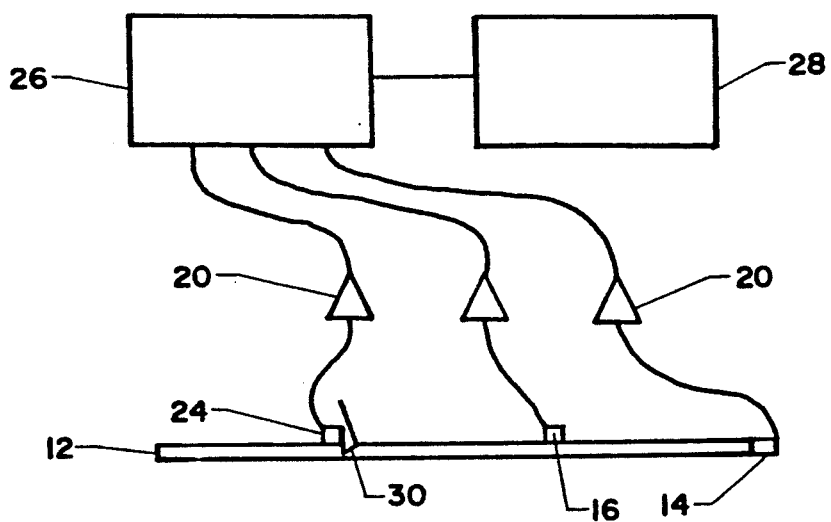
FIG. 3 is a block diagram showing the components of the system.

A third transducer 24 was placed next to the source and was used to trigger the transient recorder 26 (Le-Croy 6810) used to digitize the wave forms. After being amplified and filtered in a preamplifier 20 (Physical Acoustics Corp. 1220A with 20 kHz high pass filter), the waveforms were digitized at a sampling rate of 5 MHz on the transient recorder 26 which had a vertical resolution of 12 bits. The signals were then stored on a computer 28 for further analysis and display. A block diagram of the setup is presented in FIG. 3.

Figure 4:
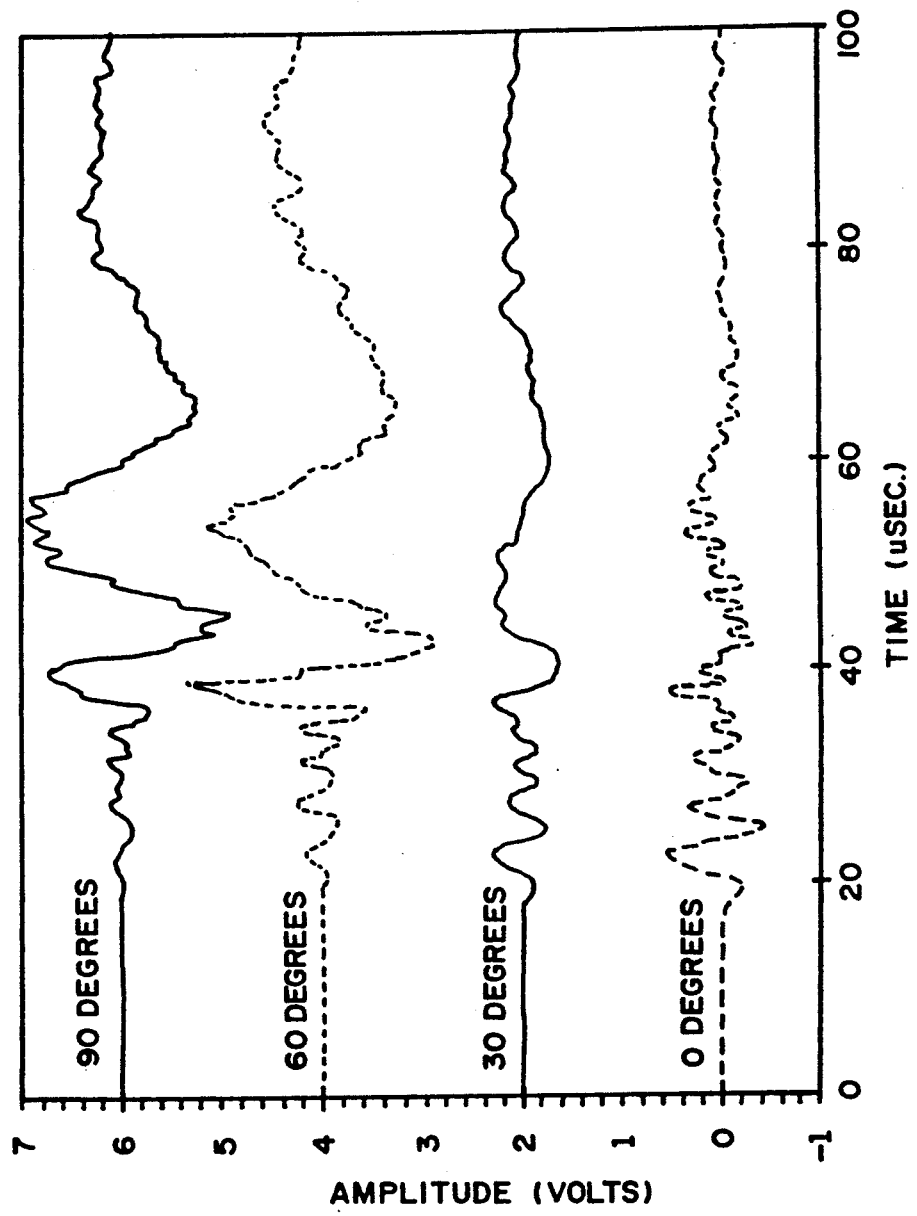
FIG. 4 is a graph showing the out-of-plane displacement components of waves created by an impact.

The out-of-plane displacement components of the waves created by the lead breaks at the four source angles are presented in FIG. 4. The waveform shown at each angle was from a lead break with a peak amplitude nearest the average peak amplitude for the ten breaks. For the source motion in the plane of the plate (0° or edge break), it can be seen that the extensional mode has its largest peak amplitude while the flexural mode has its minimum. As the source angle increases, the extensional mode peak amplitude decreases. For increases in source angle toward normal to the plate, the flexural peak amplitude increases except for the 60° to 90° cases where the 60° flexural amplitude is slightly larger than that of the 90° break. At present, it is unknown why this anomaly occurred, but it is being investigated.

Figure 5:
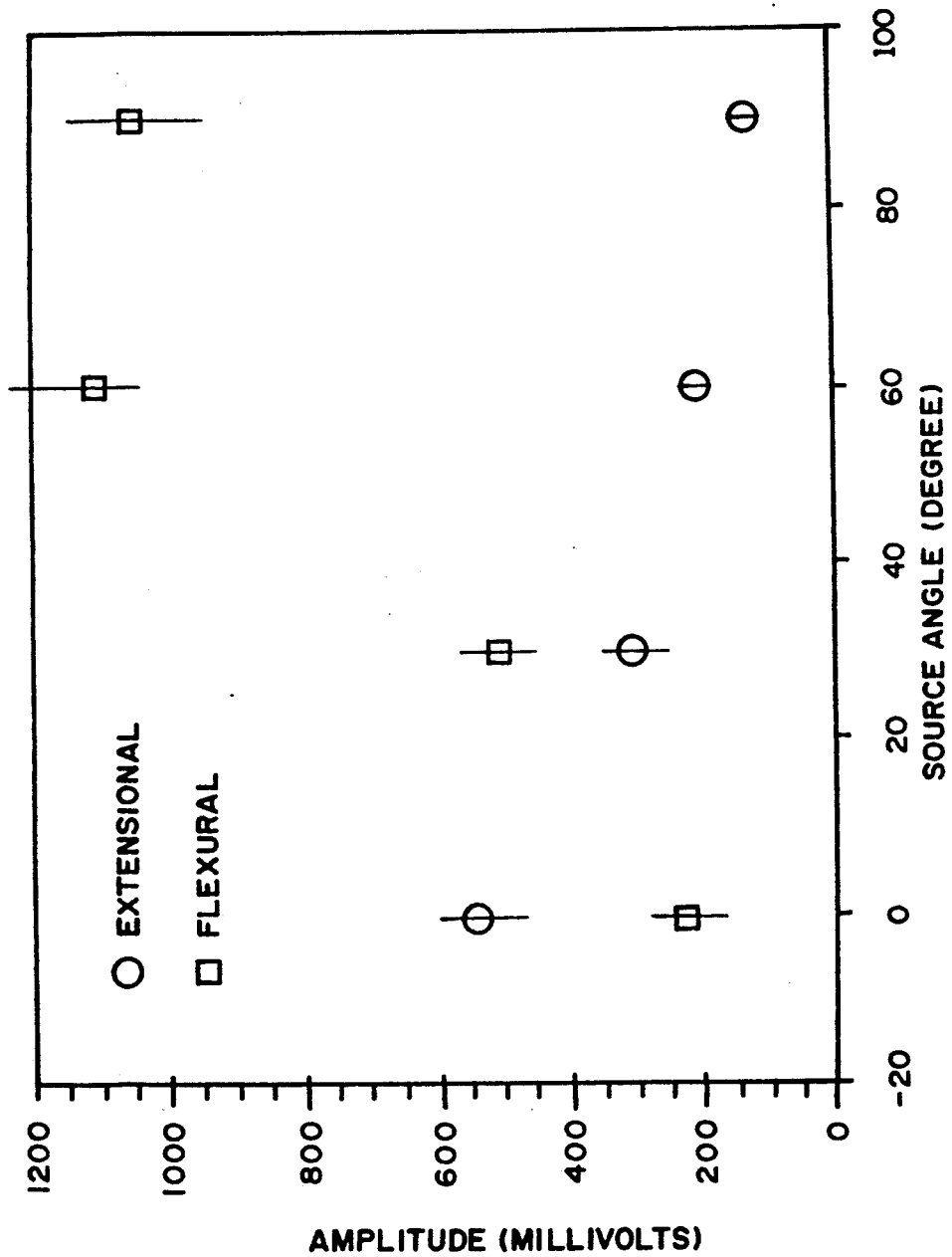
FIG. 5 is a graph showing the average peak amplitude of the out-of-plane displacement components.

The average peak amplitude of the out-of-plane displacement components of the flexural and extensional modes are plotted against source angle in FIG. 5. The standard deviations of the ten measurements are shown as the error bars in this figure. The increasing amplitudes of the flexural mode and decreasing amplitudes of the extensional mode with increasing source angle are as expected. For a 90° source, most of the source motion is normal to the plate which should produce flexural motion. The only in-plane component of the source motion is the result of the Poisson effect which is much smaller and thus produces a very small extensional mode. For the case of a 0° source, the opposite is true with source motion primarily in-plane. This creates a larger extensional mode and a smaller flexural mode. At the intermediate angles, the amount of source motion in the plane and out of the plane of the plate is proportional to the appropriate vector component of the source force. Thus as the angle increases, there should be an increasing flexural mode and decreasing extensional mode which is as observed.

Figure 6:
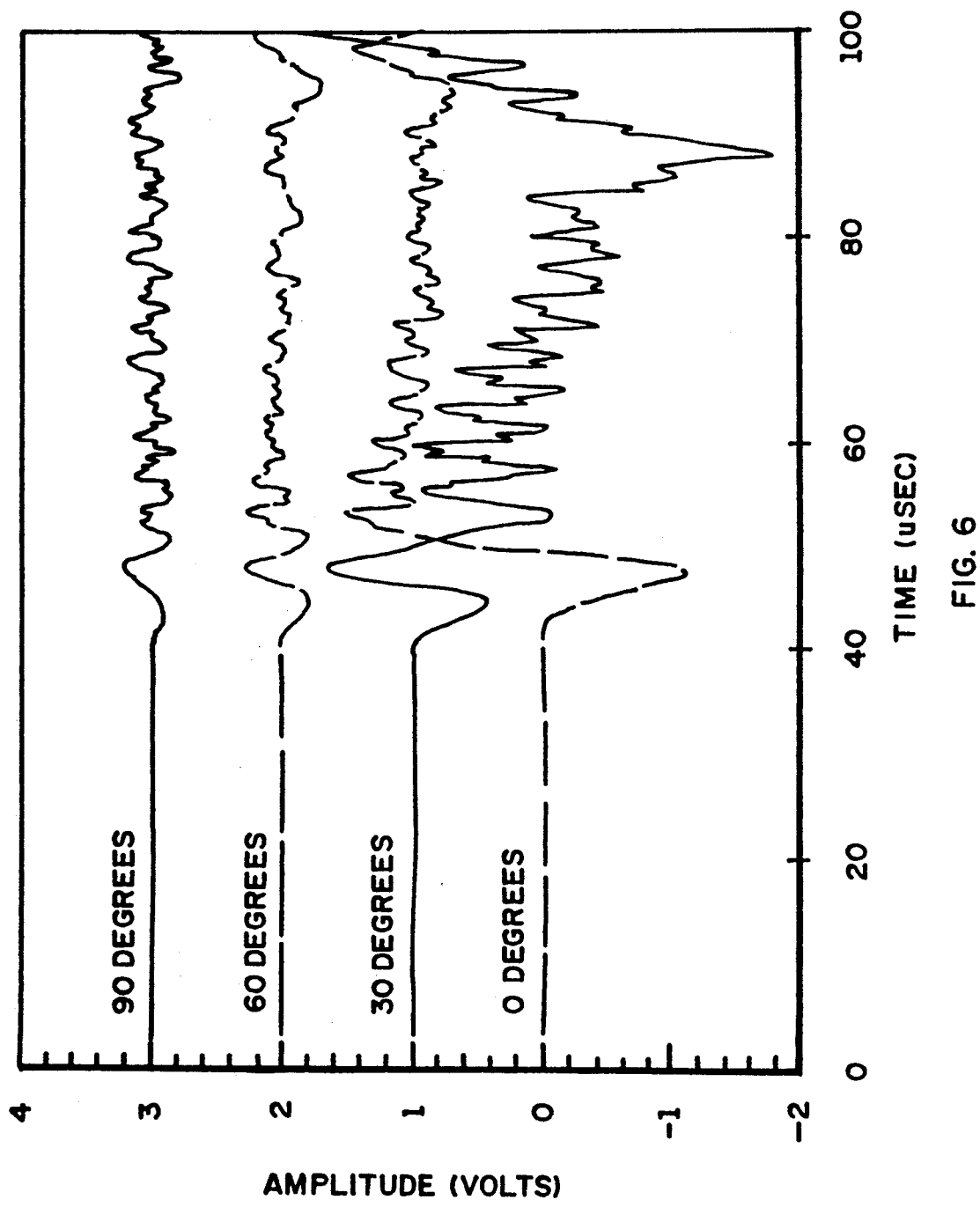
FIG. 6 is a graph showing in-plane displacement components of waves created by an impact.
Figure 7:
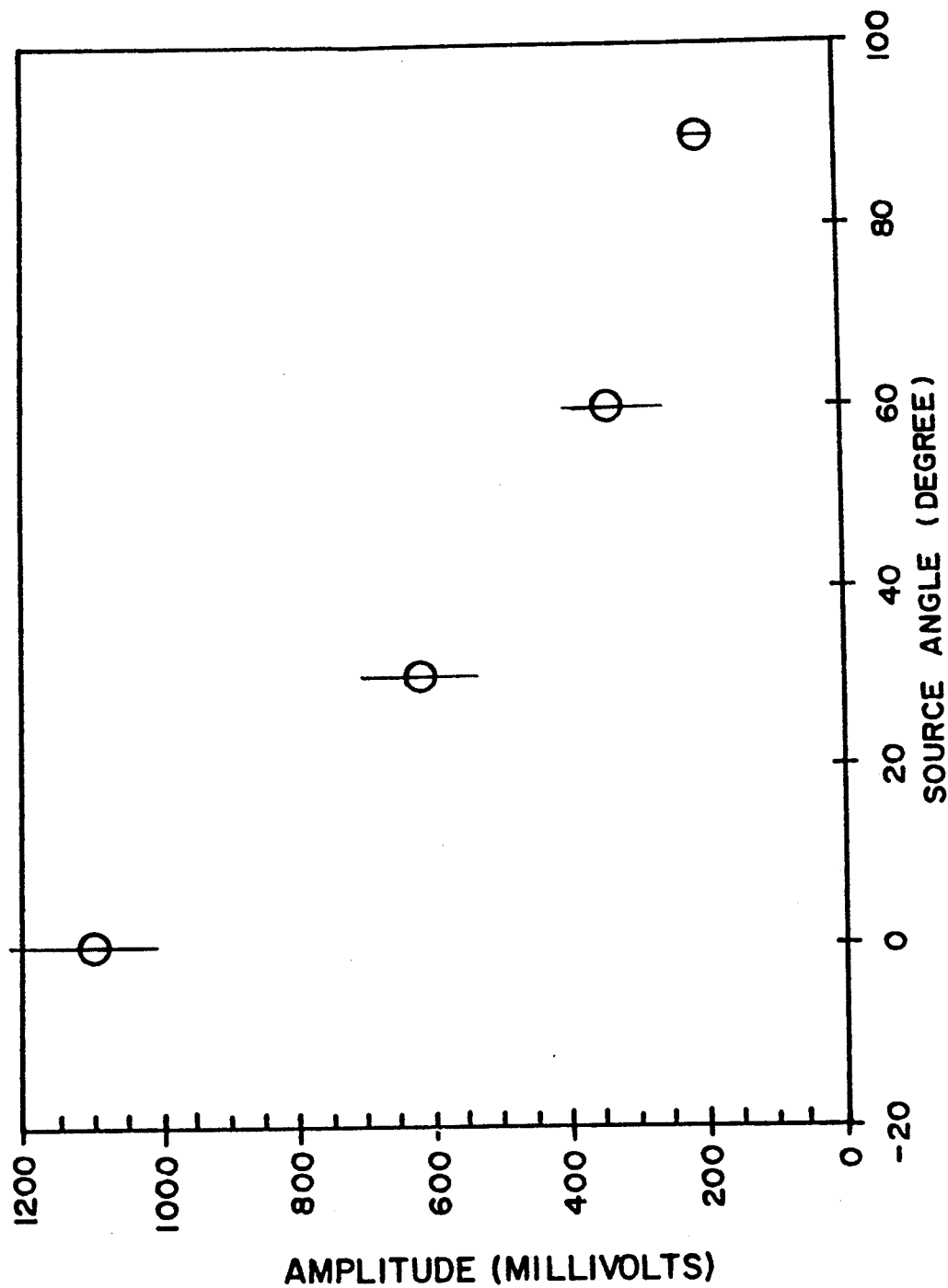
FIG. 7 is a graph showing the average peak amplitudes of the in-plane displacement components.

Examples of the above are shown in FIG. 6. Again, it is pointed out that the 0° measurement was made on a separate plate with a length of 254 mm to maintain a constant source to receiver distance. In these wave forms, the extensional amplitude again decreases with increasing source angle. However, it is interesting that the in-plane component of the flexural mode is not detected even for large source angles where it should be largest. Recall that the out-of-plane component of the extensional mode is observed for all source angles. The average peak amplitude of the in-plane component of the extensional mode is plotted in FIG. 7. The standard deviation is indicated by error bars.

These measurements demonstrate the effect of simulated acoustic emission source orientation on plate modes in thin plates. Quantitative source information can be obtained by the measurement of the amplitudes of the components of the plate modes due to real sources. One example is the case of impacts, particularly hypervelocity impacts which are a concern to spacecraft such as the proposed space station. Measurements of the amplitudes of the plate modes allows determination of the angle of the impact and the energy of the impact which will allow a better estimate of damage. Consideration of plate wave propagation will also yield more accurate source location.

We claim:
1. A method for determining the angle of impact of an object on a thin-walled structure comprising
   mounting at least one broad band transducer on or within the surface of the structure;
   detecting an impact which causes at least one symmetric and at least one antisymmetric mode wave;
   amplifying and filtering the resulting guided mode waves; and
   comparing the symmetric and antisymmetric mode waves to determine the angle of impact.

* * * * *